United States Patent [19]

Grasso et al.

[11] Patent Number: 4,902,877
[45] Date of Patent: Feb. 20, 1990

[54] POWER CONTROL FOR MULTIPLE HEATING ELEMENTS

[75] Inventors: Alfie L. Grasso, Catania, Italy; Richard C. Scott, Shatterford, United Kingdom

[73] Assignee: Micropore International Limited, Droitwich, United Kingdom

[21] Appl. No.: 129,315

[22] Filed: Dec. 3, 1987

Related U.S. Application Data

[63] Continuation of Ser. No. 897,532, filed as PCT GB85/00575 on Dec. 12, 1985, published as WO86/03929 on Jul. 3, 1986, abandoned.

[30] Foreign Application Priority Data

Dec. 21, 1984 [GB] United Kingdom ............... 8432542

[51] Int. Cl.$^4$ .............................................. H05B 1/02
[52] U.S. Cl. ....................................... 219/483; 219/486; 219/508; 219/492; 219/501; 323/235; 307/38
[58] Field of Search ............... 219/528, 212, 507–509, 219/483–486, 490, 494, 492, 497, 499, 501, 505; 323/319, 235; 307/38–41

[56] References Cited

U.S. PATENT DOCUMENTS

| | | | |
|---|---|---|---|
| 3,022,409 | 2/1962 | Williams et al. | 219/486 |
| 3,196,254 | 7/1965 | Knoop | 219/486 |
| 3,668,367 | 6/1972 | Williams | 219/486 |
| 4,377,739 | 3/1983 | Eckert, Jr. et al. | 219/497 |
| 4,400,613 | 8/1983 | Popelish | 219/497 |

FOREIGN PATENT DOCUMENTS

| | | |
|---|---|---|
| 0515660 | 3/1981 | Australia. |
| 0027976 | 5/1981 | European Pat. Off.. |
| 448121 | 7/1936 | United Kingdom. |
| 2041674 | 9/1980 | United Kingdom. |
| 2132060 | 6/1984 | United Kingdom. |

*Primary Examiner*—M. H. Paschall
*Attorney, Agent, or Firm*—Browdy and Neimark

[57] ABSTRACT

A power control arrangement for controlling the power output of a plurality of resistive heating elements (9a, 9b) comprises a multi-position switch (S1, S2) for connecting the heating elements in series and in parallel, a zero voltage switch (4), AND-gate (5), clock pulse generator (6), shift register (7) and semiconductor device (8) such as a trail which cooperate to vary the duty cycle applied to the heating elements in both serial and parallel modes.

4 Claims, 3 Drawing Sheets

4,902,877

POWER CONTROL FOR MULTIPLE HEATING ELEMENTS

This application is a continuation of application Ser. No. 897,532, filed as PCT GB85/00575 on Dec. 12, 1985, published as WO86/03929 on Jul. 3, 1986, now abandoned.

BACKGROUND OF THE INVENTION

The present invention relates to a power control arrangement for controlling the power output of a plurality of resistive heating elements.

It is known to control the power output of a resistive heating element in a number of ways. It is known from U.S. Pat. No. 4,334,147 to use burst firing techniques in which electronic switching is employed to control the power applied to the heating element by controlling the number of conductive half-cycles during which power is applied to the heating element each control period. However, burst firing techniques encounter problems with flicker when the heating element has a fast thermal response time and a highly variable resistance with temperature. In order to reduce flicker to an acceptable level the control period should be as short as possible, say five half-cycles, but as the control period becomes shorter the minimum power level rises and at one half-cycle in five the power level is 29 percent of full power. For an electric cooker having a heating element of, say, 1000 watts a minimum power output of 290 watts does not provide sufficient control.

It is also known from U.K. Patent Application No. 2 132 060 A to connect four infra-red lamps in both series and parallel, together with a diode at some power settings, to provide a minimum power level of seven percent of full power. Such an arrangement works adequately when four infra-red lamps are provided and a satisfactory range of power output can be attained. However, infra-red lamps are expensive and it is therefore desirable to reduce the number of lamps employed, but reducing the number of lamps in this prior publication brings about a severe restriction on the range of power output.

SUMMARY OF THE INVENTION

It is therefore an object of the present invention to provide a power control arrangement for a plurality of resistive heating elements which permits a wide range of power output and which is relatively inexpensive.

According to the present invention there is provided a power control arrangement for controlling the power output of a plurality of resistive heating elements, which power control arrangement comprises means for connecting said plurality of resistive heating elements in series and in parallel, and means for varying the duty cycle applied to said plurality of resistive heating elements in both series and parallel modes.

BRIEF DESCRIPTION OF THE DRAWINGS

For a better understanding of the present invention reference will now be made, by way of example, to the accompanying drawings in which.

DESCRIPTION OF PREFERRED EMBODIMENT

Figure 1:
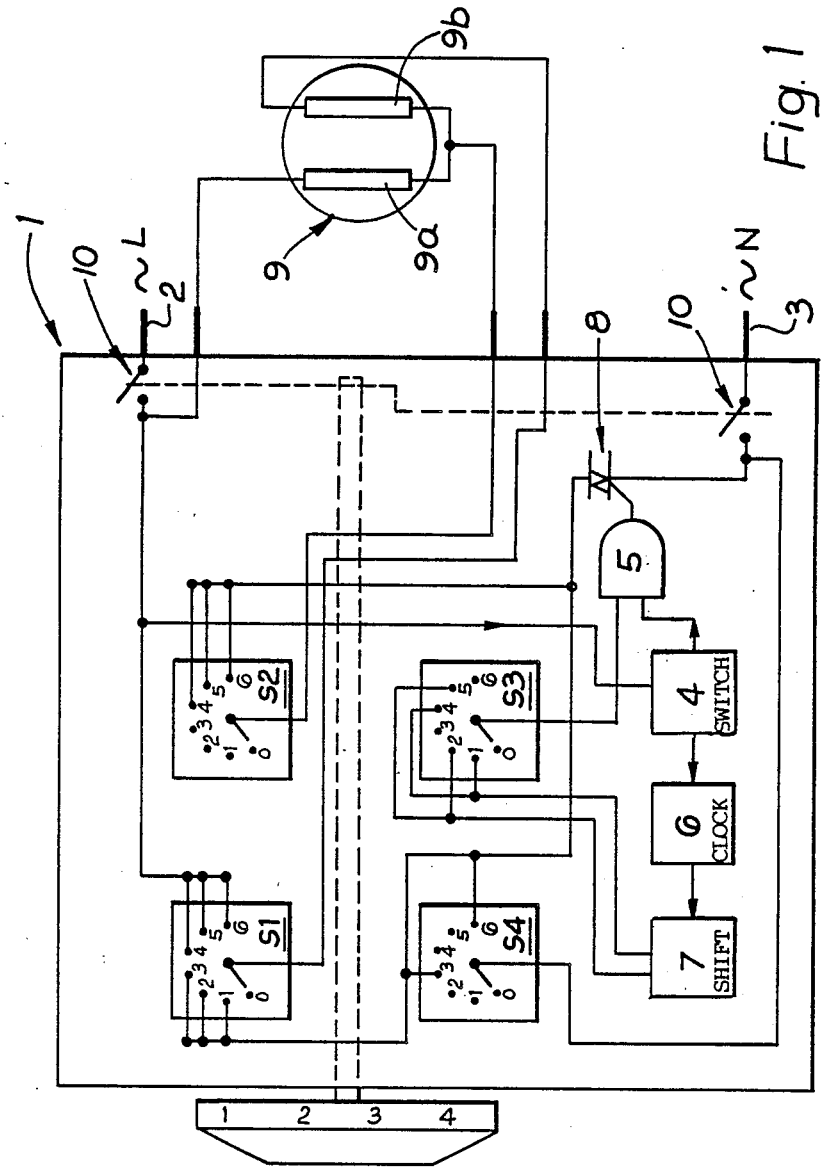
FIG. 1 is a functional block diagram of one embodiment of a power control arrangement according to the present invention.

The power control arrangement shown in FIG. 1 comprises a mechanical switch assembly 1 of four interconnected switches S1, S2, S3, S4. The switches may be cam operated or they may be, for example, in the form of a two pole seven position wafer switch with two wafers ganged together. The seven positions correspond to an "off" position and six discrete, power settings, any one of which may be selected by the operator. Clearly, a greater or lesser number of power settings could be provided. When the switch assembly 1 is in its "off" position (position 0) an on-off switch 10 is opened so as to disconnect the remainder of the power control arrangement from the applied AC mains power which is supplied across terminals 2, 3.

A zero voltage switch 4 monitors the AC power and generates a zero crossing pulse each time it detects a zero voltage crossing of the AC power. The zero crossing pulses are supplied to an AND-gate 5 and to a clock pulse generator 6. The clock pulse generator 6 generates pulses for driving a shift register 7 in response to the zero crossing pulses generated by the zero voltage switch 4.

The shift register 7 operates as a 4 bit shift right register and the output signal of the shift register 7 is fed to positions 1, 2, 4 and 5 of switch S3 and from switch S3 to the AND-gate 5. In this way the waveform generated by the shift register 7 is gated out to a semiconductor device 8, such as a triac or back-to-back thyristors, at the zero crossing point of the mains power so that the semiconductor device 8 becomes conductive without generating harmonic distortion which could give rise to radio frequency interference. This method of activating the semiconductor device 8 also serves to limit the surge current when the heating element 9 is energised.

The heating element 9 comprises two separate elements 9a and 9b. One end of heating element 9a is connected to on-off switch 10, the other end of heating element 9a is connected to one end of heating element 9b and both are connected to the pole of switch S2. The other end of heating element 9b is connected to the pole of switch S1.

The neutral line of the mains power is connected to the pole of switch S4.

The semiconductor device 8 is connected in series with the heating element 9 by way of switches S1, S2 and S3 in such a way that at power settings 1, 2 and 3 switch S2 is ineffective and the heater elements 9a, 9b are connected in series, with power being connected to semiconductor device 8 by way of switch S1. At power settings 4, 5 and 6 switch S2 connects the heater elements in parallel and switch S1 supplies power to heating element 9b. Switch S4 is effective at power settings 3 and 6 where switch S3 is ineffective and serves to supply full power to the heating elements 9a and 9b with the heating elements connected in series at power setting 3 and in parallel at power setting 6.

Figure 2A:
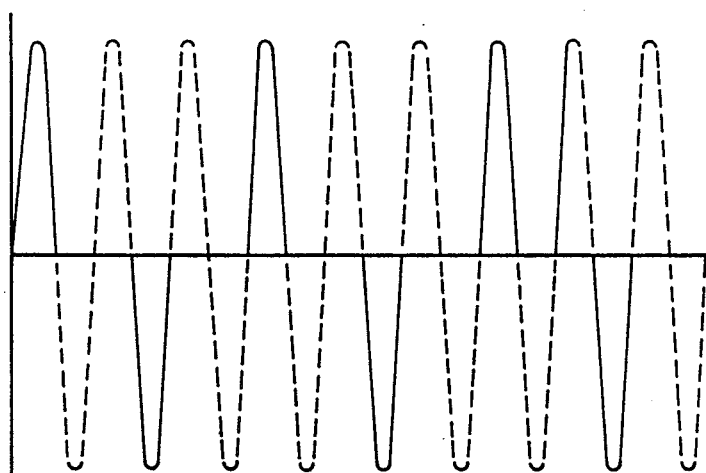
FIGS. 2A to 2C illustrate power signals corresponding to various power level settings.
Figure 2B:
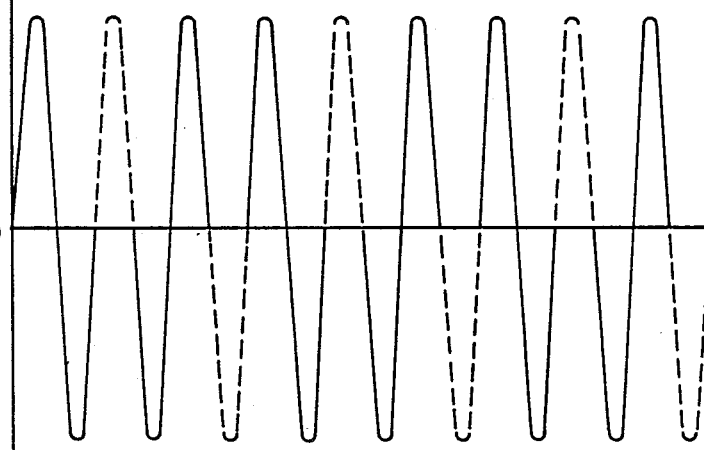
Figure 2C:
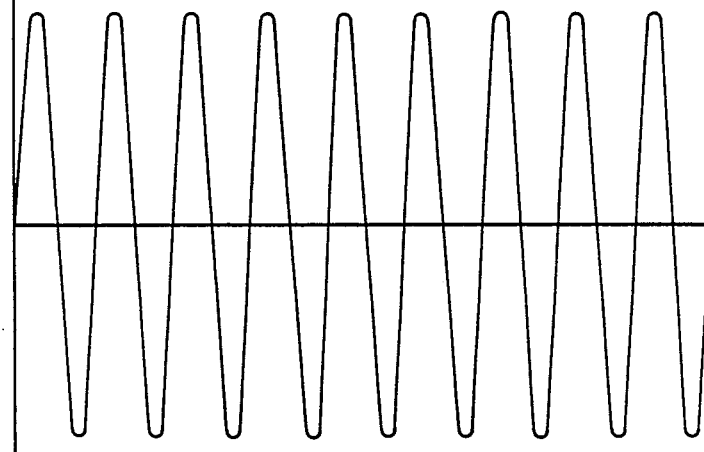

The combined effect of switches S3 and S4 can be seen from FIGS. 2A to 2C. For power settings 1 and 4 switch S3 permits the semiconductor device 8 to be conductive for one half-cycle in every three half cycles, with the heating elements 9a, 9b connected in series at power setting 1 and in parallel at power setting 4. This represents a duty cycle of $\frac{1}{3}$. For power settings 2 and 5, as FIG. 2B shows, switch S3 permits the semiconductor device 8 to be conductive for two half-cycles in every three half cycles, with the heating elements 9a, 9b connected in series at power setting 2 and in parallel at power setting 5. This represents a duty cycle of ⅔. FIG. 2C shows that switch S4 by-passes the semiconductor device 8 at power settings 3 and 6 and represents full duty cycle.

The connections at the various power settings are summarised in the following Table 1.

TABLE 1

| Power Setting | Heater element arrangement | Duty cycle | Proportion of full power delivered by heater |
|---|---|---|---|
| 0 | — | — (0%) | 0% |
| 1 | series | ⅓ (33%) | 15% |
| 2 | series | ⅔ (67%) | 25% |
| 3 | series | 3/3 (100%) | 34% |
| 4 | parallel | ⅓ (33%) | 43% |
| 5 | parallel | ⅔ (67%) | 73% |
| 6 | parallel | 3/3 (100%) | 100% |

In the event of failure of the electronic circuitry the power control arrangement shown in FIG. 1 does not cease operating entirely, but because at power settings 3 and 6 the electronic circuitry is by-passed these two settings remain available until such time as the electronic circuitry can be repaired or replaced.

As described above the triggering of the semiconductor device 8 is based on a control interval of three half cycles. However, it is not necessary to have this control interval and the control interval may be any suitable number of half or full-cycles. For example, the control interval may be three full cycles and the semiconductor device may be activated for one, two or three full cycles during the control interval, although this may give rise to annoying flicker. Alternatively the control interval may be four or more half cycles which enables a greater number of power level settings. In one particular embodiment (not illustrated) it may be desirable to introduce an additional power setting between power setting 0 and power setting 1 described above. This may be accomplished by changing the burst firing method to include an additional setting at one half cycle in five which gives rise to a power output of 10 percent of full power. However, this again may give rise to annoying flicker and if the control interval is an even number of half cycles may result in an undesirable DC component in the mains current because successive half cycle pulses will all be of the same polarity.

In order to limit surge current to an acceptable level it is advisable to construct the power control arrangement in such a way that the user can only change the power level from setting 0 to setting 6, that is from "off" to full power, by way of the intermediate settings. In this way, power settings 1, 2 and 3 provide an effective means of limiting surge current because the heating elements 9a, 9b are connected in series and the heating elements will have an opportunity to heat to an acceptable temperature before power setting 4 is attained and the heating elements are connected in parallel.

Figure 3:
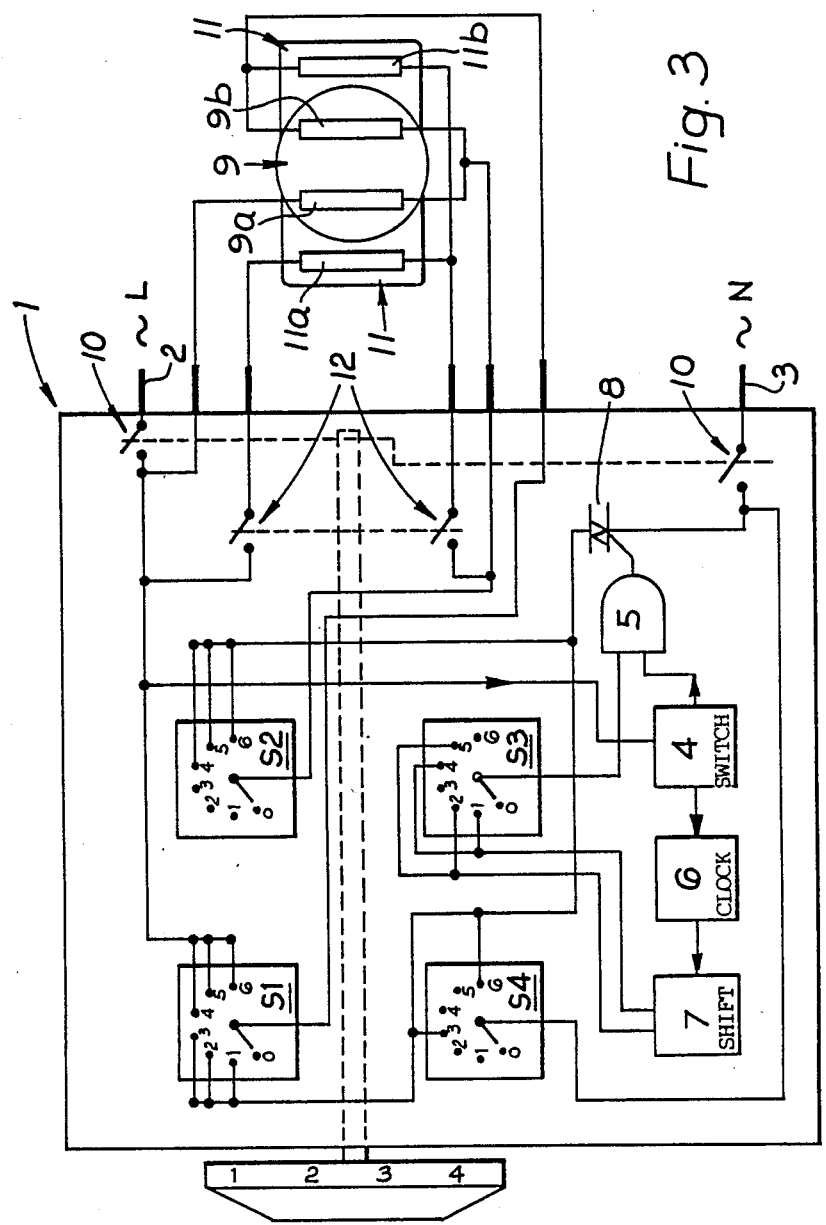
FIG. 3 is a functional block diagram showing a further embodiment of a power control arrangement according to the present invention.

The power control arrangement shown in FIG. 3 is similar to that shown in FIG. 1 and the same reference numerals are used to refer to the same or similar conponents. The power control arrangement shown in FIG. 3 is particularly suitable for use with dual-circuit heaters such as those heaters in which a further heating element 11 is arranged around, at one side or at both sides of the first-mentioned heating element 9. The heating elements 9 and 11 may be separated by a wall of insulating material (not shown). A switch 12 is used to control the supply of power to heating element 11 in such a way that heating element 11 cannot be energised independently of heating element 9, but heating element 9 can be energised independently of heating element 11. The switch 12 can be concentric with the knob for setting the power level for the heating element 9 and can be operated for example by a pulling, pushing or rotary action. Switch 12 can be made of a conventional pair of contacts or can be a semiconductor device. The heating element 11 comprises elements 11a and 11b which are connected in series, or parallel as with the elements 9a and 9b.

The heating elements 9a, 9b shown in FIGS. 1 and 3 and the heating elements 11a, 11b shown in FIG. 3 may be, for example, bare resistance wires or infra-red lamps.

The electronic circuitry described is simple and inexpensive whilst permitting a wide range of power output as a result of a combination of burst firing and series/parallel connection of the heating elements.

We claim:

1. Heating apparatus for an electric cooking appliance comprising:
   only two resistive heating elements having a fast thermal response, such as infra-red lamps;
   power source means for providing a source of alternating current; and
   manually operable switch means for controlling the power output of said two elements in response to energization with alternating current, said switch means comprising connecting means for selectively connecting the elements in series or in parallel, selecting means for selecting a proportion of complete half-cycles of alternating current to be blocked from energizing said elements, and blocking means for blocking the selected proportion of complete half-cycles from energizing said elements irrespective of whether said elements are connected in series or in parallel.

2. The heating apparatus of claim 1, wherein said switch means comprises a mechanical switch assembly of four interconnected switches.

3. The heating apparatus of claim 1, including means for preventing selection of a maximum power setting of said manually operable switch means except by way of at least one intermediate power setting.

4. The heating apparatus of claim 1, wherein said switch means is selectable to supply one, two or three half cycles of current in every three half cycles to said heating elements.

* * * * *